United States Patent
Hemphill et al.

(10) Patent No.: US 10,730,447 B1
(45) Date of Patent: Aug. 4, 2020

(54) PICKUP TRUCK LOCKBOX

(71) Applicant: FORD GLOBAL TECHNOLOGIES, LLC, Dearborn, MI (US)

(72) Inventors: Joshua R. Hemphill, White Lake, MI (US); Jack Marchlewski, Saline, MI (US); Dragan B. Stojkovic, Taylor, MI (US); Robert Reiners, Grosse Ile, MI (US); Jeffrey Gray, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/287,606

(22) Filed: Feb. 27, 2019

(51) Int. Cl.
*B60R 9/06* (2006.01)
*E05C 7/02* (2006.01)
*E05B 83/00* (2014.01)

(52) U.S. Cl.
CPC .............. *B60R 9/065* (2013.01); *E05B 83/00* (2013.01); *E05C 7/02* (2013.01); *E05Y 2900/516* (2013.01)

(58) Field of Classification Search
CPC ......... B60R 9/00; B60R 11/06; B60R 13/013; B60R 2011/004; B62D 33/0273; Y10S 224/925
See application file for complete search history.

(56) References Cited

U.S. PATENT DOCUMENTS

| | | | |
|---|---|---|---|
| 4,749,226 A * | 6/1988 | Heft | B62D 33/0273 296/37.6 |
| 5,526,972 A | 6/1996 | Frazier et al. | |
| 5,669,537 A | 9/1997 | Saleem et al. | |
| 5,924,616 A * | 7/1999 | Shives | B60R 11/06 224/281 |
| 6,170,724 B1 * | 1/2001 | Carter | B60R 9/00 220/4.29 |
| 6,257,640 B1 * | 7/2001 | Leitner | B60R 9/00 224/404 |
| 6,626,478 B1 * | 9/2003 | Minton | B60P 3/40 224/403 |
| 6,732,895 B2 | 5/2004 | Poliquin et al. | |
| 6,883,851 B2 * | 4/2005 | McClure | B60R 13/01 224/42.2 |
| 7,097,224 B2 * | 8/2006 | Lester | B60R 9/00 224/404 |
| 7,160,071 B2 | 1/2007 | Legge | |
| 7,309,093 B2 | 12/2007 | Ward | |

(Continued)

FOREIGN PATENT DOCUMENTS

FR    2944493 A3    10/2010

OTHER PUBLICATIONS https://shedheads.net/best-2017-wheel-well-tool-box.

*Primary Examiner* — Brian D Nash
(74) *Attorney, Agent, or Firm* — David Coppiellie; MacMillan, Sobanski & Todd, LLC

(57) ABSTRACT

A pickup truck that includes a bed having a side wall with an electric panel; and a lockbox having walls secured to, extending laterally from the side wall and surrounding the electric panel, and a security panel pivotally mounted on the walls to enclose the electric panel within the lockbox. The lockbox may also include a divider pivotally mounted to the walls inboard of the security panel and movable between a closed position extending longitudinally adjacent to the security panel and an open position extending laterally into the bed. A lock may secure the divider to the walls.

15 Claims, 3 Drawing Sheets

(56) References Cited

U.S. PATENT DOCUMENTS

| | | | |
|---|---|---|---|
| 7,631,919 B2 | 12/2009 | Schrader | |
| 8,869,576 B2 * | 10/2014 | O'Leary | E05B 83/22 |
| | | | 70/257 |
| 8,931,819 B2 * | 1/2015 | Daniel | B60J 7/1621 |
| | | | 29/428 |
| 9,481,316 B2 * | 11/2016 | Faruque | B62D 33/027 |
| 2001/0038219 A1 * | 11/2001 | Clare | B60R 11/06 |
| | | | 296/37.6 |
| 2002/0163196 A1 * | 11/2002 | Brofft | B23K 9/1006 |
| | | | 290/1 A |
| 2003/0189353 A1 * | 10/2003 | Moore | B60R 11/06 |
| | | | 296/37.6 |
| 2004/0164578 A1 * | 8/2004 | MacK | B60J 7/1614 |
| | | | 296/26.04 |
| 2006/0102669 A1 * | 5/2006 | Fouts | B60R 9/00 |
| | | | 224/404 |
| 2007/0006867 A1 * | 1/2007 | Karney | A47J 37/07 |
| | | | 126/37 B |
| 2007/0132264 A1 * | 6/2007 | Koneval | B62D 33/0273 |
| | | | 296/57.1 |
| 2007/0252435 A1 * | 11/2007 | Coe | H02J 7/1423 |
| | | | 307/10.1 |
| 2009/0309381 A1 * | 12/2009 | Nelson | B62D 33/0273 |
| | | | 296/26.11 |
| 2011/0132947 A1 * | 6/2011 | Spencer | B60R 11/06 |
| | | | 224/404 |
| 2014/0266001 A1 * | 9/2014 | Wilde | H02J 7/35 |
| | | | 320/101 |
| 2014/0339845 A1 * | 11/2014 | Lang | B60R 9/06 |
| | | | 296/37.6 |
| 2016/0009232 A1 * | 1/2016 | Budny | B60R 11/06 |
| | | | 206/373 |
| 2016/0167718 A1 * | 6/2016 | Wilson | B62D 33/0207 |
| | | | 224/404 |
| 2017/0349106 A1 * | 12/2017 | Zajicek | B60R 11/06 |
| 2018/0339581 A1 * | 11/2018 | Rossi | B60P 7/02 |

\* cited by examiner

PICKUP TRUCK LOCKBOX

BACKGROUND OF THE INVENTION

The present invention relates to a pickup truck and more particularly to a lockbox employed with a pickup truck.

Open pickup truck beds are convenient for loading and unloading as well as transporting cargo and other items. However this convenience also allows for items in the bed to be exposed to the weather or removal by unauthorized people. Tonneau covers, caps and other methods of enclosing the bed are helpful in some circumstances, but may limit the dimensions of the cargo or make loading or unloading of cargo less convenient than an open bed. Accordingly, it may be advantageous to provide for storage within the bed that provides security and protection from the weather while still allowing for a generally open bed.

SUMMARY OF THE INVENTION

An embodiment contemplates a pickup truck including a bed having a side wall with an electric panel; and a lockbox having walls secured to, extending laterally from the side wall and surrounding the electric panel, and a security panel pivotally mounted on the walls to enclose the electric panel within the lockbox.

An embodiment contemplates a pickup truck including a bed having a side wall with an electric panel; and a lockbox. The lockbox includes walls secured to, extending laterally from the side wall and surrounding the electric panel; a security panel pivotally mounted on the walls to enclose the electric panel within the lockbox; a divider pivotally mounted to the walls inboard of the security panel and pivotable to a closed position extending longitudinally adjacent to the security panel; and a lock selectively securing the divider and the security panel to the walls.

An advantage of an embodiment is that the pickup bed may be generally open for loading and unloading cargo while providing a secure and weather protected location for smaller items. Additionally, the secure location prevents unauthorized people from accessing an electric panel within the bed. Further, a portion of the box employed for providing the secure location for items and electric panel access may be used to create a bed divider.

DETAILED DESCRIPTION

Figure 1:
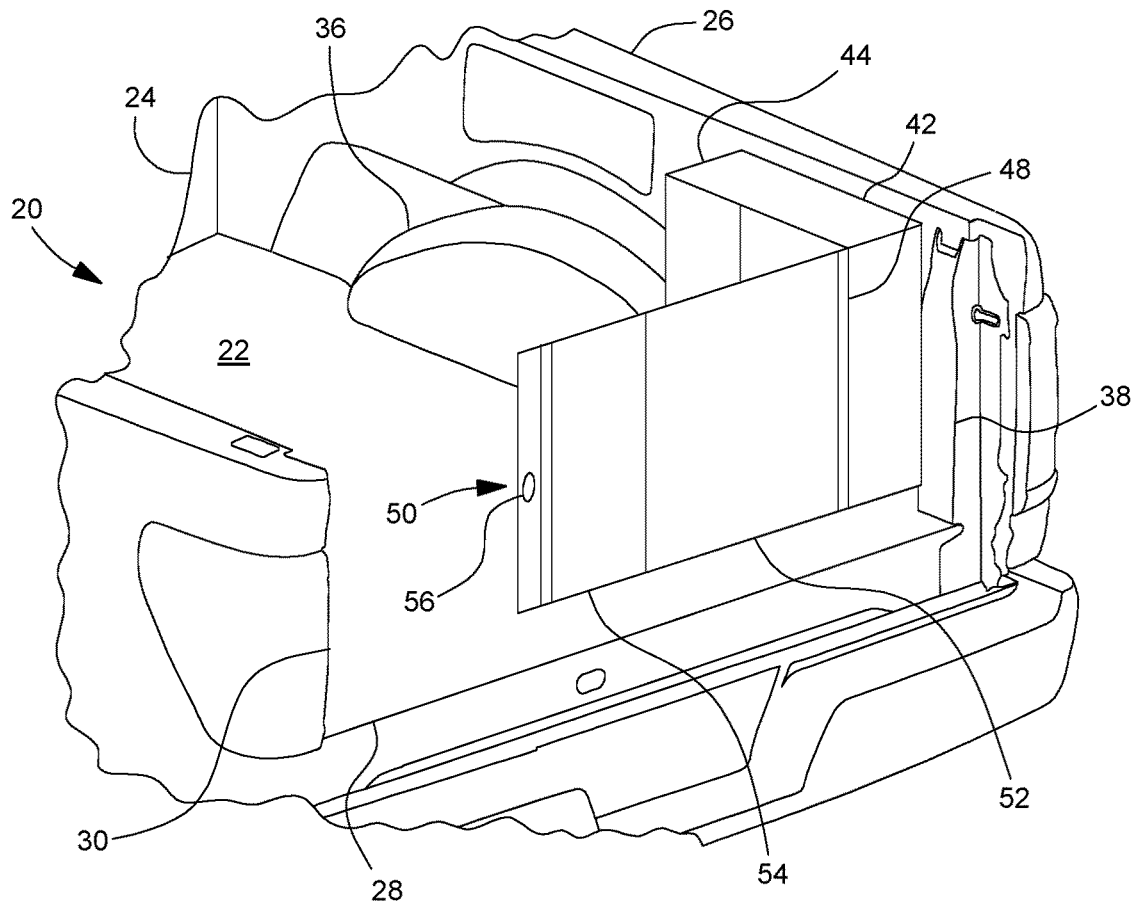
FIG. 1 is a schematic perspective view of a rear portion of a pickup truck, without the tailgate shown, and without holes through a divider shown.

FIGS. 1-6 illustrate a pickup truck 20 having a bed 22 with a laterally extending front wall 24, a pair of longitudinally extending side walls 26, a floor 28 and a rear opening 30 into which a tailgate (not shown) may close to close off the bed 22. The tailgate may be conventional if so desired and so will not be shown herein.

A side wall 26 includes an electric panel 32, having electric sockets 34, between a wheel well 36 and a rear end 38 of the bed 22. The electric sockets 34 may connect to an electrical system, such as for example a vehicle electrical system, and allow for electricity to extension cords and electrically powered equipment. The side wall 26 may also include a standard interface plate 40 that allows a lockbox 42 to be easily secured/removed from the side wall 26 by installation/removal of, for example, a clip. Other means of attachment of the lockbox 42 may also be employed, such as for example fasteners, such as screws or bolts, if so desired.

The lockbox 42 may include walls 44 that extend laterally inward from the side wall 26 into the bed 22 and surround the electric panel 32 to form an enclosed box. The walls 44 are secured to the side wall 26, with the clip or fasteners securing the walls 44 to the side wall 26 within the confines of the walls 44 in order to prevent unauthorized persons from removing the lockbox 42 from the bed 22. The side wall 26 of the bed 22 in effect forms the back wall of the lockbox 42, while a pair of hinged members form the front wall of the lockbox 42 and access to the inside of the lockbox 42.

A first hinged member is a security panel 46 that is pivotally attached to one of the vertical walls 44 of the lockbox 42 about a vertical hinge 48, which may be, for example, a piano hinge—although other types of hinges may be employed instead if so desired. The security panel 46 may be a solid sheet of material in order to keep rain and other types of debris out of the lockbox 42 in order to protect items contained in the lockbox 42, while also preventing these items from falling out into the bed 22.

A second hinged member is a divider 50, which also pivotally mounts to one of the vertical walls 44, may employ the same hinge 48, if so desired. The divider 50 is inboard from the security panel 46. The hinge 48 may be on the rear vertical wall of the lockbox walls 44, allowing the divider 50 to swing inward to a laterally extending orientation near the rear end 38 of the bed 22.

The divider 50 may include a pair of panels, a hinged panel 52, which mounts the divider 50 to the hinge 48 and a lock panel 54, which telescopically slides into and out of the hinged panel 52 as well as having a lock 56 mounted adjacent to an end of this panel 54. The panels 52, 54 may have dog leg portions 58, 60, respectively, in order to avoid interference with the security panel when both are in their closed positions. The divider panels 52, 54 may also include holes 62 to allow for securement of tie-downs to prevent items in the bed 22 from rolling around while the pickup truck 20 is moving.

The lock 56 may be mounted to the lock panel 54 and be located to engage a locking portion 64 of the front vertical wall of the lockbox walls 44. Thus, when the lock panel 54 is telescopically slid into the hinged panel 52 and pivoted to the closed (longitudinally oriented) position (see FIGS. 4 and 5), the lock 56 engages the locking portion 64 to securely enclose items in the lockbox 42. Also, when closed and locked, this prevents access to the electric panel 32 from those who do not have a key (or other means) to unlock the lock 56.

Figure 2:
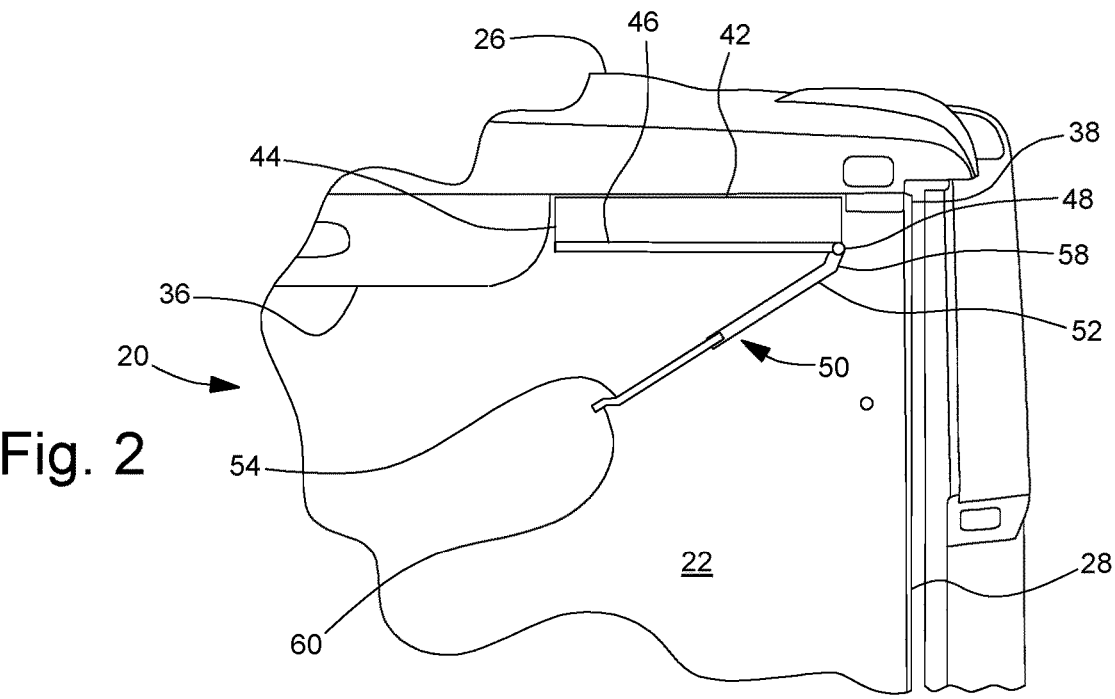
FIG. 2 is a schematic plan view of a rear portion of a pickup truck, without the tailgate shown.
Figure 3:
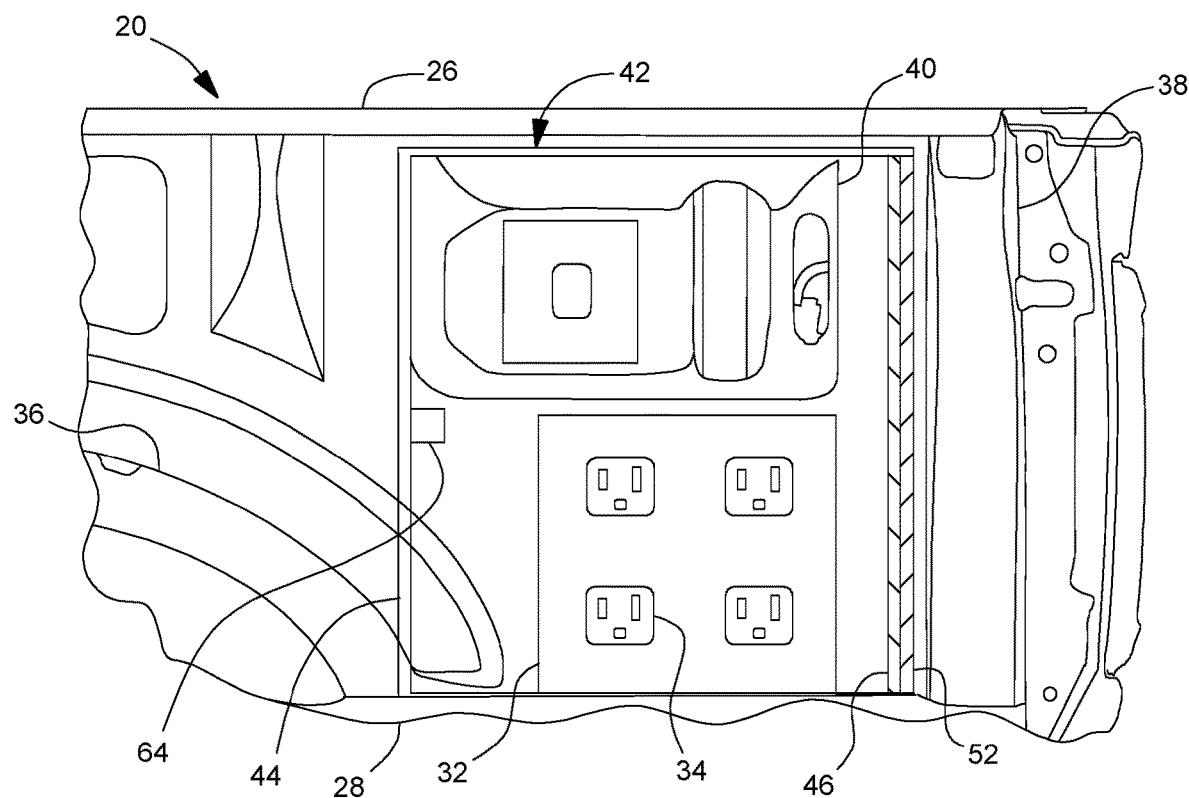
FIG. 3 is a schematic, partial cross section, side view of a rear portion of a pickup truck bed, without the tailgate shown, and with a lockbox security panel and a divider in an open position.
Figure 4:
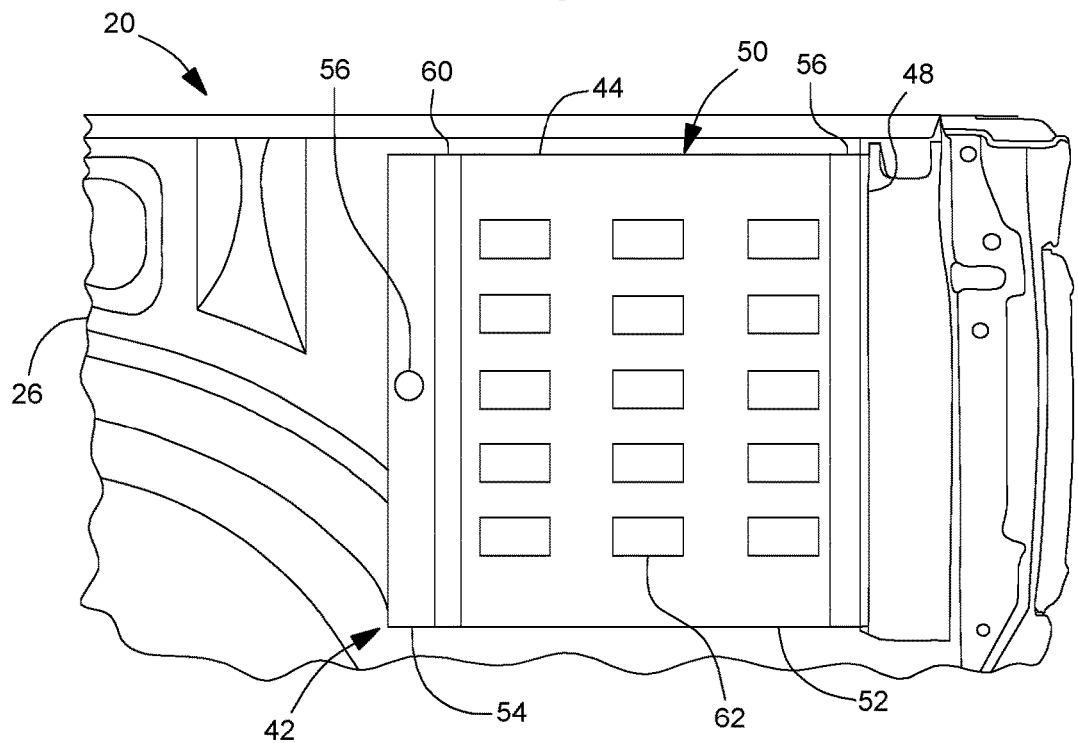
FIG. 4 is a schematic view, side view of a rear portion of a pickup truck bed, without the tailgate shown, and with a lockbox security panel and a divider in a closed position.
Figure 5:
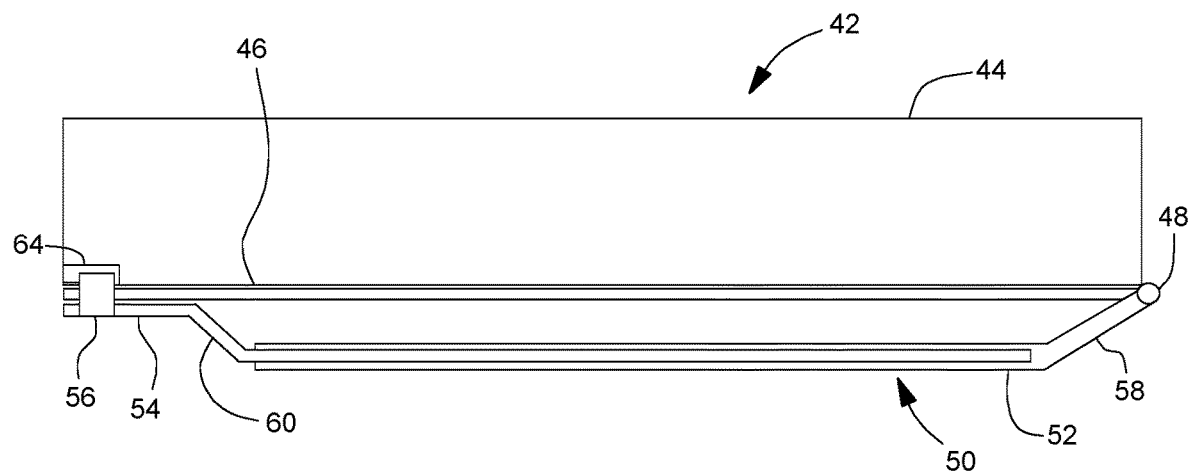
FIG. 5 is a schematic plan view of the lockbox with the lockbox door and divider in closed positions.

FIG. 2 shows the divider 50 partially opened, but with the security panel 46 closed. This retains items in the lockbox 42 and prevents water and dirt from entering the lockbox 42, but allows for ease in opening the security panel 46 to access the electric panel 32 and items located in the lockbox 42 (see FIG. 3, with the security panel open as well). FIG. 1 illustrates both the security panel 46 and divider 50 open, with the lock panel 54 telescopically slide outward relative to the hinged panel 52.

Figure 6:
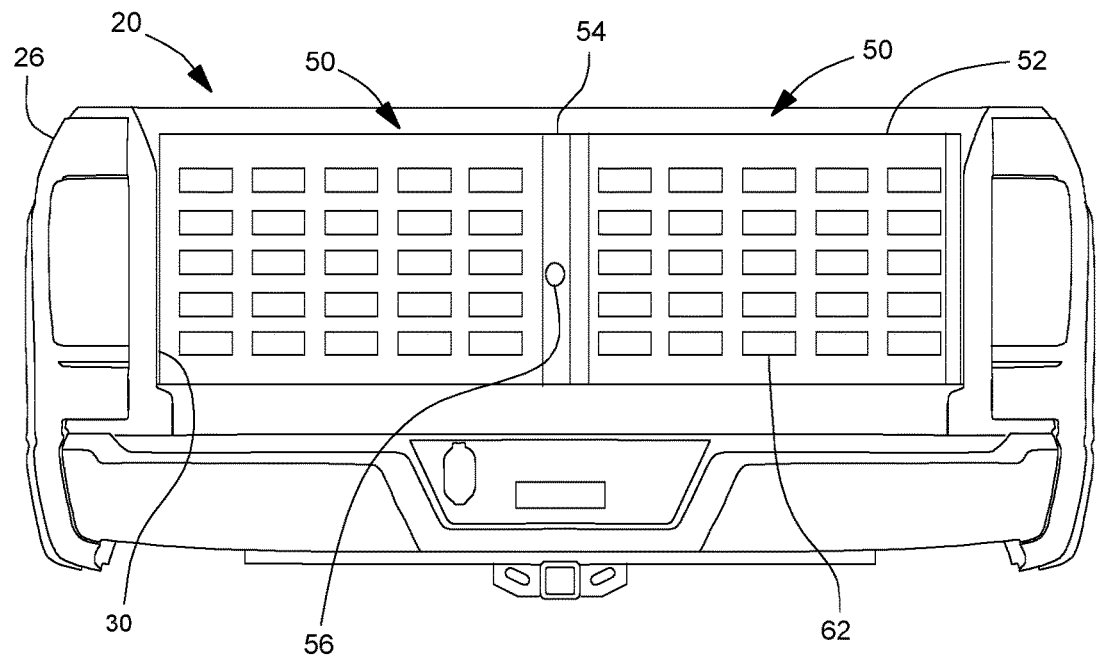
FIG. 6 is a schematic rear view of the pickup, without the tailgate shown, with two dividers shown in open positions in the bed.

FIG. 6 illustrates a pickup truck 20 that includes one lockbox 42 on each side wall 26 of the bed 22, with the two each including dividers 50 pivoted open to extend laterally. The lock panels 54 of each divider 50 are then attached together to create a wall that helps contain items in the bed 22.

While certain embodiments of the present invention have been described in detail, those familiar with the art to which this invention relates will recognize various alternative designs and embodiments for practicing the invention as defined by the following claims.

The invention claimed is:

1. A pickup truck comprising:
    a bed having a side wall with an electric panel having an electric socket; and
    a lockbox having walls secured to, extending laterally from the side wall and surrounding the electric panel, and a security panel pivotally mounted on the walls to enclose the electric panel within the lockbox; and
    wherein the lockbox further includes a divider pivotally mounted to the walls inboard of the security panel and pivotable between a closed position extending longitudinally adjacent to the security panel and an open position extending laterally into the bed.

2. The pickup truck of claim 1 wherein the lockbox includes a hinge attached to one of the walls and pivotally securing both the security panel and the divider to the one wall.

3. The pickup truck of claim 2 wherein the divider includes a hinged panel secured to the hinge and a lock panel telescopically mounted to and extending from the hinged panel.

4. The pickup truck of claim 3 wherein the lock panel includes a lock that selectively locks the divider to the walls when the divider is in the closed position.

5. The pickup truck of claim 1 wherein the divider includes a hinged panel secured to the hinge and a lock panel telescopically mounted to and extending from the hinged panel.

6. The pickup truck of claim 5 wherein the lock panel includes a lock that selectively locks the divider to the walls when the divider is in the closed position.

7. The pickup truck of claim 1 wherein the divider includes holes configured to secure cargo in the bed.

8. The pickup truck of claim 1 including an opposed side wall having a second lockbox with a second divider, the divider and the second divider configured to engage when pivoted to laterally extending orientations.

9. The pickup truck of claim 1 wherein the lockbox includes a lock that selectively secures the security panel to the walls when the security panel is in a closed position.

10. The pickup truck of claim 1 wherein the walls are configured to be secured to the side wall so that the walls can only be released from the side wall when the security panel is in an open position.

11. A pickup truck comprising:
    a bed having a side wall with an electric panel having an electric socket; and
    a lockbox including:
    walls secured to, extending laterally from the side wall and surrounding the electric panel;
    a security panel pivotally mounted on the walls to enclose the electric panel within the lockbox;
    a divider pivotally mounted to the walls inboard of the security panel and pivotable to a closed position extending longitudinally adjacent to the security panel; and
    a lock selectively securing the divider and the security panel to the walls.

12. The pickup truck of claim 11 wherein the lockbox includes a hinge attached to one of the walls and pivotally securing both the security panel and the divider to the one wall.

13. The pickup truck of claim 11 wherein the divider includes a hinged panel secured to a hinge on one of the walls and a lock panel telescopically mounted to and extending from the hinged panel.

14. The pickup truck of claim 11 including an opposed side wall having a second lockbox with a second divider, the divider and the second divider configured to engage when pivoted to laterally extending orientations.

15. A pickup truck comprising:
    a bed having a side wall with an electric panel having an electric socket; and
    a lockbox having walls secured to, extending laterally from the side wall and surrounding the electric panel, and a security panel pivotally mounted on the walls to enclose the electric panel within the lockbox, wherein the walls are configured to be secured to the side wall so that the walls can only be released from the side wall when the security panel is in an open position.

* * * * *